UNITED STATES PATENT OFFICE.

ISAAC C. HART, OF CINCINNATI, OHIO, ASSIGNOR OF ONE-HALF TO WILLIAM D. McCRACKEN, OF SANFORD, FLORIDA.

PLASTERING COMPOUND.

SPECIFICATION forming part of Letters Patent No. 452,346, dated May 12, 1891.

Application filed July 14, 1890. Serial No. 358,725. (No specimens.)

*To all whom it may concern:*

Be it known that I, ISAAC C. HART, a citizen of the United States, and a resident of Cincinnati, in the county of Hamilton and State of Ohio, have invented certain new and useful Improvements in Plastering Compounds, of which the following is a specification.

The object of my invention is to provide a plastering compound in a dry state which may be readily mixed for use in any quantity desired, and, when mixed with the requisite quantity of water, will retain its fatty or spreading qualities until thoroughly troweled down to a smooth even finish and then harden to a smooth even finish.

I have found by experience that any compound containing lime slaked dry in the usual manner with pure water soon loses much of its fatty properties and sets quickly. Such compounds require great skill and speedy work to apply a reliable, hard, and non-crumbling coat. My invention overcomes these difficulties, as with my compound a light, hard, durable coat may be applied by even non-skilled artisans.

The essential feature of my invention consists in dry-slaking the lime for my compound with glue-water. The lime so slaked is an essential ingredient in the compound, whether it be made for a white finishing-coat, a gray finishing-coat, or for a first coat for brick-work.

I will give the proportions for my compound which I have by experience found best for the different kinds of work; but I do not limit myself to the exact proportions given, as they may be varied within certain limits and yet attain the object of my invention.

The first step in preparing my compound is to dissolve, by weight, one part of good glue in thirty-three parts of water. This mixture I use for slaking lime. I employ about four and one-eighth gallons of the mixture to every bushel of lime. I find that lime treated in this way slakes into a dry powder. This dry powder I employ in combination to form my plastering compounds for the various uses required by the trade. For a fine white finishing-coat, I mix thoroughly three parts, by measure, of the lime so slaked with one part of calcined sulphate of lime. For a gray finishing-coat, I thoroughly mix three parts of the lime so slaked, one part of calcined sulphate of lime, and one part of fine sand. For a white sand finish, I substitute the same proportion of white sand for the common fine sand. For a brown-finish first coat for lath-work, I mix three parts of the slaked lime, one part of calcined sulphate of lime, and four parts of fine sand. For first coating for brick-work, I mix three parts of the slaked lime, eight parts of fine sand, and one part of calcined sulphate of lime.

Each of the above compounds is mixed dry and put up in sacks for sale or transportation. When it is desired to use either, it is only necessary to add enough clear water to make a mortar of the desired consistency.

If it be desired to have the mortar set slower, the quantity of glue employed in slaking the lime is increased, and if the setting should be hastened the quantity is decreased, and the proportion of sulphate of lime may be increased, if it be desired, to make the plaster harder.

What I claim is—

1. The hereinbefore-described process of mixing glue with lime as a retarder for plastering purposes, which consists in first dissolving glue in water, then adding sufficient of the glue-water to lime to slake the lime to a dry powder.

2. A dry plastering compound composed of the following ingredients: the dry-slaked lime and glue hereinbefore described, calcined sulphate of lime, and sand, mixed together in the proportions specified.

I. C. HART.

Witnesses:
GEO. J. MURRAY,
M. L. MURRAY.